(12) United States Patent
Houghton et al.

(10) Patent No.: US 9,473,346 B2
(45) Date of Patent: Oct. 18, 2016

(54) SYSTEM AND METHOD FOR NETWORK PATH VALIDATION

(71) Applicant: Firebind, Inc., Burlington, MA (US)

(72) Inventors: Jerry A. Houghton, Townsend, MA (US); David J. Patterson, Bedford, MA (US)

(73) Assignee: Firebind, Inc., Burlington, MA (US)

( * ) Notice: Subject to any disclaimer, the term of this patent is extended or adjusted under 35 U.S.C. 154(b) by 540 days.

(21) Appl. No.: 13/721,295

(22) Filed: Dec. 20, 2012

(65) Prior Publication Data

US 2013/0185428 A1 Jul. 18, 2013

Related U.S. Application Data

(60) Provisional application No. 61/579,943, filed on Dec. 23, 2011.

(51) Int. Cl.
H04L 12/24 (2006.01)
H04L 12/26 (2006.01)
H04L 29/14 (2006.01)
H04L 29/06 (2006.01)

(52) U.S. Cl.
CPC ........... *H04L 41/00* (2013.01); *H04L 43/0811* (2013.01); *H04L 69/162* (2013.01); *H04L 69/40* (2013.01)

(58) Field of Classification Search
CPC ... H04L 69/40; H04L 41/00; H04L 43/0811; H04L 69/162
USPC .......... 709/203, 223, 224, 225, 239; 710/38; 714/36
See application file for complete search history.

(56) References Cited

U.S. PATENT DOCUMENTS

| | | | | |
|---|---|---|---|---|
| 5,751,698 | A * | 5/1998 | Cushman | H04Q 11/0478 370/252 |
| 6,195,352 | B1 * | 2/2001 | Cushman | H04L 43/0811 370/395.6 |
| 7,130,305 | B2 * | 10/2006 | Kuukankorpi | H04L 29/12009 370/392 |
| 7,146,642 | B1 * | 12/2006 | Magdych | H04L 63/1433 726/22 |
| 7,243,148 | B2 * | 7/2007 | Keir | G02B 5/3083 709/224 |

(Continued)

FOREIGN PATENT DOCUMENTS

JP 2012053683 A * 3/2012

OTHER PUBLICATIONS

Martin Krzywinski., Port Knocking: An introduction to how trusted users can manipulate firewall rules to transmit information across closed ports., from Linux™ Journal., Jun. 2003. http://www.linuxjournal.com/article/6811?page=0,2.*

(Continued)

*Primary Examiner* — Kostas Katsikis
(74) *Attorney, Agent, or Firm* — Duquette Law Group, LLC

(57) ABSTRACT

In a server device, a method for validating a network path in a network includes receiving a listing of ports from a client device, each port in the listing of ports associated with the server device and receiving a request message from the client device via a first identified port in the listing of ports. The method includes, in response to receiving the request message, opening a subsequent identified port in the listing of ports for communication with the client device and, following opening of the subsequent identified port in the listing of ports, transmitting a response message to the client device via the first identified port.

23 Claims, 10 Drawing Sheets

(56) References Cited

U.S. PATENT DOCUMENTS

| | | | | |
|---|---|---|---|---|
| 7,519,954 | B1* | 4/2009 | Beddoe | H04L 63/1433 709/224 |
| 7,664,845 | B2* | 2/2010 | Kurtz | G02B 5/3083 705/7.11 |
| 7,735,140 | B2* | 6/2010 | Datla | H04L 63/1433 726/22 |
| 7,904,553 | B1* | 3/2011 | Ham | H04L 41/147 709/217 |
| 7,912,046 | B2* | 3/2011 | Li | H04L 29/12009 370/389 |
| 8,135,823 | B2* | 3/2012 | Cole | G02B 5/3083 709/224 |
| 8,606,884 | B2* | 12/2013 | Kim | 709/219 |
| 8,931,096 | B2* | 1/2015 | Freeman | G06F 21/566 709/220 |
| 2004/0039938 | A1* | 2/2004 | Katz et al. | 713/201 |
| 2005/0044227 | A1* | 2/2005 | Haugh et al. | 709/226 |
| 2005/0075842 | A1* | 4/2005 | Ormazabal | H04L 63/1433 702/188 |
| 2005/0188086 | A1* | 8/2005 | Mighdoll | G06F 8/65 709/225 |
| 2006/0047824 | A1* | 3/2006 | Bowler | H04L 63/0236 709/229 |
| 2006/0265506 | A1* | 11/2006 | Merkh | H04L 69/163 709/227 |
| 2006/0274726 | A1* | 12/2006 | Wikman | H04L 29/12066 370/352 |
| 2007/0044156 | A1* | 2/2007 | Redmann | 726/25 |
| 2007/0180126 | A1* | 8/2007 | Merkh | H04L 63/0227 709/227 |
| 2008/0140836 | A1* | 6/2008 | Miyawaki | A63F 13/12 709/225 |
| 2008/0320152 | A1 | 12/2008 | Padmanabhan et al. | |
| 2009/0069018 | A1* | 3/2009 | Babbar | H04L 67/322 455/445 |
| 2009/0089868 | A1* | 4/2009 | Sasaki | H04L 29/12509 726/7 |
| 2009/0207726 | A1* | 8/2009 | Thomson | H04L 12/437 370/216 |
| 2010/0070972 | A1* | 3/2010 | Kumagai et al. | 718/1 |
| 2011/0096828 | A1* | 4/2011 | Chen | H04N 21/23106 375/240.02 |
| 2012/0210433 | A1 | 8/2012 | Kovar et al. | |
| 2013/0166595 | A1* | 6/2013 | Meketa et al. | 707/783 |
| 2014/0025817 | A1* | 1/2014 | Lau | H04L 49/30 709/225 |

OTHER PUBLICATIONS http://www.merriam-webster.com/dictionary/subsequent.*
http://dictionary.reference.com/browse/subsequent?s=t.*
"Description of the Portqry.exe Command-Line Utility," Microsoft Support (http://support.microsoft.com/default.aspx?scid=kb;en-us;310099), Dec. 3, 2007, Microsoft, USA.
"Configuring a MyFirewall Test," Visualware Support (http://www.myconnectionserver.com/support/v9/config_firewall.html), Visualware, USA.
"Netgauge Testing Methodology," Ookla (https://support.ookla.com/entries/22992373-NetGauge-Testing-Methodology), Jan. 23, 2013, Ookla, USA.
Kreibich, Christian; Weaver, Nicholas; Nechaev, Boris; and Paxson, Vern, "Measuring Access Connectivity Characteristics with Netalyzr," (https://www.nanog.org/meetings/nanog49/presentations/Wednesday/measuring_access_n49.pdf), Jun. 13, 2010, pp. 23, ICSA and UC Berkeley, USA.

* cited by examiner

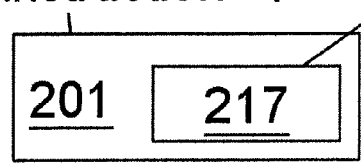
start instruction / port list (N...M) / 201 / 217
FIG. 2A
203
FIG. 2B
start acknowledgement
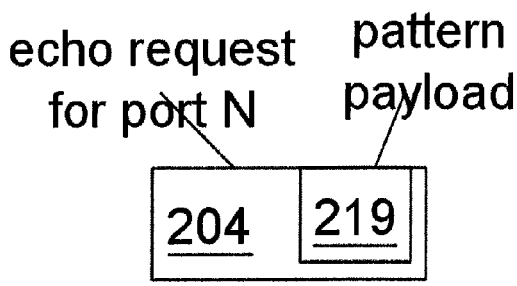
echo request for port N / data pattern payload / 204 / 219
FIG. 2C
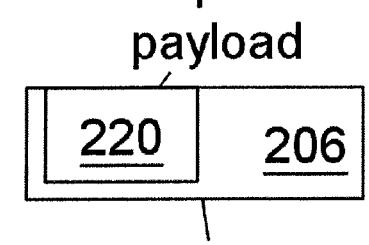
data pattern payload / 220 / 206
echo response for port N
FIG. 2D
skip instruction
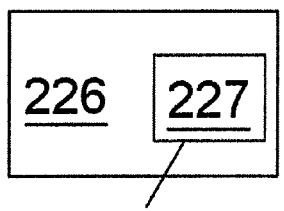
226 / 227
port number
FIG. 2E
228
skip acknowledgement
FIG. 2F
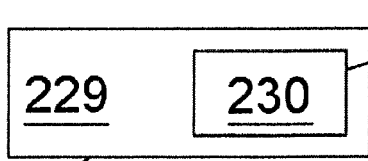
result data / 229 / 230
FIG. 2G
client device result

SYSTEM AND METHOD FOR NETWORK PATH VALIDATION

RELATED APPLICATIONS

This patent application is a continuation U.S. Provisional Application No. 61/579,943, filed on Dec. 23, 2011, entitled, "SYSTEM AND METHOD FOR NETWORK PATH VALIDATION," the contents and teachings of which are hereby incorporated by reference in their entirety.

BACKGROUND

With the rapid growth of the Internet as a public network, users have found its cost effectiveness appealing and continue to deploy media intensive applications and organizational information. The result is a shift from static applications with sparse media content to rich interactive systems with intensive use of media transmitted over various pathways over both public and private networks. The prolific growth of media intensive network applications such as Voice Over IP (VoIP) and video telepresence has driven the interest in understanding why a network can or cannot transmit data over a Transmission Control Protocol (TCP) or User Datagram Protocol (UDP) port and hence the need for network path verification.

Network access providers and operators continue to address concerns of security, network management, and bandwidth control by deploying intervening network devices such as firewalls, content and bandwidth filters, and other data restricting devices between end users of these rich applications. Growth of residential network access devices, such as broadband routers and media gateways, impose transmission restrictions using user configurable and default settings. It is not unusual in today's business environment to have blocked transmissions paths over commonly used protocols and TCP/UDP ports. Utilizing a system for path verification can reveal transmission restrictions in a network and give insight into the mechanism and resolution for such restrictions.

The end user of a path validation system needs to know where data can be successfully transmitted and where it cannot. This knowledge is typically obtained on an almost continuous basis, rather than on a piecemeal approach, as many rich applications utilize several protocols and ports together and hence require verification to run in rapid succession to both emulate actual application data and exercise the decentralized nature of crossing global networks. An automated solution to path validation provides detection of locations along the transmission path where various restrictions may exist.

To be effective, a path validation system must utilize as much network infrastructure as possible along the path under validation. This approach requires transmission of data from inside an operator's own network along a path that may involve multiple public or private networks to a target endpoint and then back along the return path. This represents a complete messaging cycle of send, receive, and reply. Any failures along this path represent different failure modes and yield higher understanding of the network path capabilities.

SUMMARY

One of the most common methods used to test whether a given TCP port is blocked or not is to use the Telnet protocol. For this approach to have any value, there must be some application (e.g., layer 4 through 7, such as HTTP, SIP, etc.) listening on the port(s) under test. The user initiates a Telnet connection to the remote host over the chosen TCP port, and if the connection is immediately refused (i.e. the Telnet connection terminates immediately), it provides a strong indication that the connection is blocked or filtered in some way. If the Telnet connection attempt is successful, then, depending on the application the user is connecting to, there may be some identifying text that is returned to the user's screen.

Success of the Telnet method is highly dependent on the listening application. For example, performing a Telnet connection to a web server on TCP port 80 will generally create a text based response from the HTTP server with HTTP related traffic. However, this traffic could also be a response by an intermediate proxy server type device and the user could mistakenly believe they have connected all the way through to their remote host when in fact they only connected to a proxy server which is blocking their communication with that remote host. Even if there is no intermediary device blocking or filtering the TCP traffic on the chosen port, the actual application listening on that port might not provide any useful feedback to that Telnet connection attempt (e.g. the application might be listening but upon receiving an unexpected connection attempt from a Telnet client it might immediately terminate the connection.)

The Telnet approach is therefore useful only in limited circumstances where the listening application can provide a clear indication that the user has in fact connected to the remote host. This approach cannot classify how a given port might be blocked and in the case of an intermediate proxy server type device, can actually create a false positive impression (e.g., where the user connects to the proxy device but thinks he connected to the remote host.) Finally, the Telnet method cannot be used with the UDP protocol.

Other port scanning mechanisms, such as MICROSOFT PortQry, is similar to the Telnet method in that it provides for a connection and transfer of TCP data. Additionally, PortQry supports the UDP protocol which is an improvement upon Telnet for primitive path test utility. However, like Telnet, it is an origination only tool and cannot accept, listen, or reply to path verification data sent to it. PortQry does however provide an abbreviated specification of ports to connect with.

Existing attempts to verify data transmission over a network involve laborious and manual instrumentation of both the origin and endpoint of the network path. For example, a network administrator could manually install a machine in a remote location across the network requiring verification, and then locally install a machine to originate data transfer from. The administrator would then need to establish a listener on a particular TCP or UDP port on the remote server and then send data from the local machine across the network and then have the remote machine respond in kind. The setup of such an apparatus requires the manual plumbing of various generalized components to play parts of listener, transmitter, receiver, reply function, reporter, and analyzer. This procedure would be required for each and every TCP or UDP port to be verified. Additionally, if port specific payloads are desired then these must be handcrafted and inserted into the transmission step for each data transfer. Also, the use of an extrinsic network analyzer would be required to perform verification and nature of any failure condition. For example, MICROSOFT PortQry and netcat can be employed in this capacity. However, both of these tools require manual installation and configuration.

By contrast to conventional testing mechanisms, embodiments of the innovation relate generally to a system and method for network path validation and more specifically to both a sequenced and automated data transmission over a network path as defined by a nexus of Internet protocol (IP) addresses and TCP or UDP port numbers. During operation, a remote network device can be unreachable for several reasons, including network discontinuities, intervening, blocking, or filtering devices or origin-based network deficiencies. These conditions are exercised by embodiments of the innovation and their corresponding failure or success conditions recorded for administrative or resolution purposes. For example, during a connection attempt, the client device may receive notification of a TCP handshake failure even with prior knowledge of a corresponding listener in place across the network on the same TCP port. With embodiments of the innovation, the failure condition can be narrowed to a smaller set of causes that are within the client device's network side, such as a TCP RST message during connection attempt In one arrangement, a client device or a server device can provide origination, acceptance, and transfer of both TCP and UDP data using a signaling algorithm. The client or server device can be configured to provide both solicited verification and mass scale verification across many network paths concurrently due to data acceptance, or a silent drop of the sent SYN message or drop of the returning SYN or ACK messages.

Additionally, embodiments of the innovation provide for verification of multiple sequenced TCP or UDP network paths. In one arrangement, this is made possible by the transmission of a session or port specific payload during the send operation. This session or port specific payload causes the as-configured server device to open and listen on the next port in sequence before replying to the original data transmission. This operation continues iteratively over a specified set of TCP or UDP ports until either the set has been exhausted or an unrecoverable error has been encountered.

With such a configuration, the system can provide notification of the exact nature of any failure condition between the client device and the server device that may occur at any step during the operation. The information about the nature of failures provides detailed knowledge of the underlying network conditions leading to the failure, which, in turn, can lead to identification of precise resolutions and remedies by operators, administrators, or other stakeholders with interest in the success of path verification. Additionally, the automated verification of a TCP or UDP network pathway in a network minimizes or prevents the potential for human-induced errors.

In one arrangement, a server device is configured to perform a method for validating a network path in a network. The method includes receiving, by the server device, a listing of ports from a client device, each port in the listing of ports associated with the server device. The method includes receiving, by the server device, a request message from the client device via a first identified port in the listing of ports. The method includes, in response to receiving the request message, opening, by the server device, a subsequent identified port in the listing of ports for communication with the client device. The method includes following opening of the subsequent identified port in the listing of ports, transmitting, by the server device, a response message to the client device via the first identified port.

In one arrangement, a client device is configured to perform a method for validating a network path in a network. The method includes transmitting, by the client device, a listing of ports to a server device, each port in the listing of ports associated with the server device. The method includes transmitting, by the client device, a request message to the server device via a first identified port in the listing of ports. The method includes, in the absence of a response message from the server device, transmitting, by the client device, a skip instruction message to the server device on a non-blocked port associated with the server device, the skip instruction message configured to cause the server device to open a subsequent identified port in the listing of ports for communication with the client device.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

FIG. 2A illustrates a start instruction, according to one arrangement.

FIG. 2B illustrates a start acknowledgement, according to one arrangement.

FIG. 2C illustrates an echo request, according to one arrangement.

FIG. 2D illustrates an echo response, according to one arrangement.

FIG. 2E illustrates a skip instruction, according to one arrangement.

FIG. 2F illustrates a skip acknowledgement, according to one arrangement.

FIG. 2G illustrates a device result, according to one arrangement.

DETAILED DESCRIPTION

Embodiments of the innovation are directed to techniques for analysis of per-port path connectivity across a network. For example, a system includes a client device and a server device that communicate via a network. The client device includes a controller that is configured to perform orchestrated connectivity analysis upon a set of one or more ports.

The client device also includes a network I/O subsystem configured to perform network communications over a connection such as a TCP or UDP connection on behalf of the client controller. The client device is configured to originate data transfer to the server device across a network and perform both transmission and reception of data over the network to and from the server.

The server device includes a server controller, a network I/O subsystem and a data storage subsystem. The server controller is configured to perform orchestrated connectivity analysis on behalf of a client device and upon reception of data transmission from a client device. The server network I/O system is configured to perform network communications over a TCP or UDP connection on behalf of the server controller. The server data storage subsystem is configured to maintain a historical record of all analysis activity performed by the server device.

Figure 1:
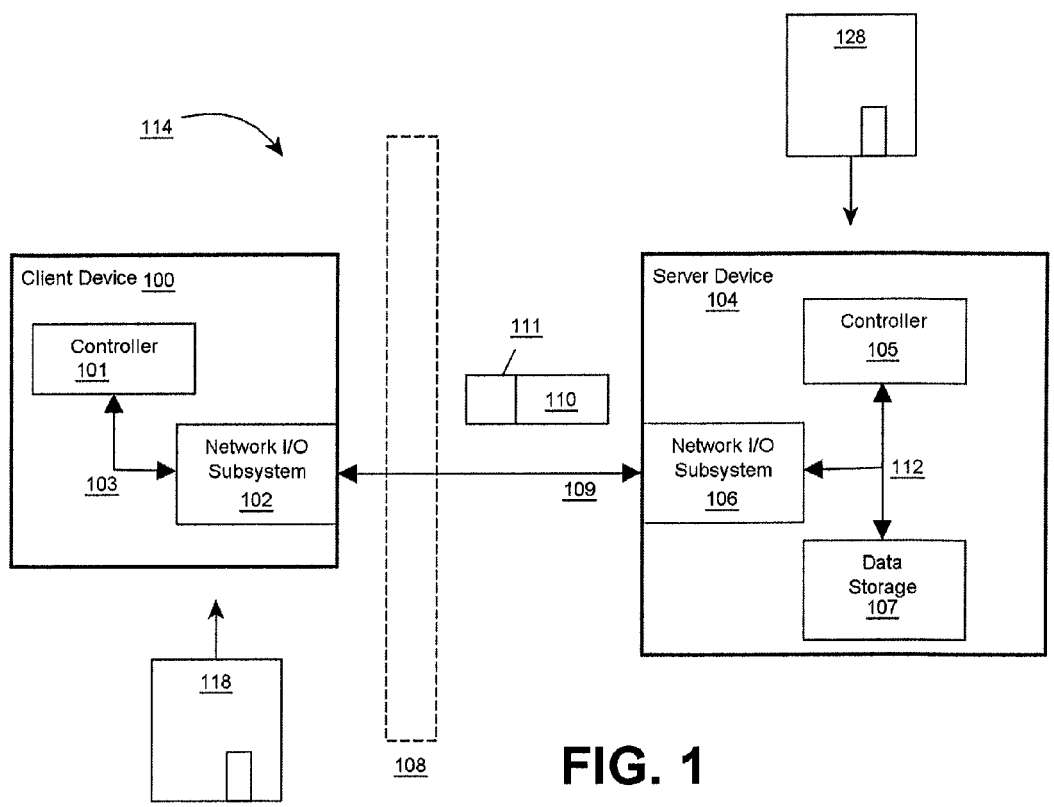
FIG. 1 is a schematic representation illustrating the path verification system, according to one arrangement.

FIG. 1 illustrates an arrangement of a network path validation system 114. The system 114 includes a client device 100 connected via a network 108 to a server device 104. The network 108 is configured as any arrangement of a computer network model (e.g., a local area network, the Internet, a wireless network) and can contain any number of computerized network communications equipment such as routers, switches, and firewalls.

The client device 100 includes a controller 101 and a network I/O subsystem 102 (e.g., an Ethernet network interface card) that are configured to communicate via an electrically coupled communications bus 103. While the controller 101 can be configured in a variety of ways, in one arrangement the controller 101 includes a memory and processor disposed in electrical communication with each other. The network I/O subsystem 102 is configured for transmission and reception of data over network 108 and performs these operations on behalf of the controller 101.

The server device 104 includes a controller 105, network I/O subsystem 106 and data storage 107 that are all electrically coupled to each other via communications bus 112. The network I/O subsystem 106 (e.g. an Ethernet network interface card) performs transmission and reception of data over network 108 on behalf of controller 105. The data storage 107 (e.g. a configuration of magnetic disk drives or random access memory) performs persistent long term storage of data on behalf of controller 105. The controller 105 is configured to open a TCP or UDP socket to listen on any port or collection of ports utilizing network I/O subsystem 106. Once open, these sockets (on their associated ports) are configured to listen for connections 109 initiated by a client device 100 over network 108. Once the client device completes a connection 109 the client device controller 101 is configured to send and receive data 110 to the server device controller 105. The server controller 105 is configured to open any number of sockets on any TCP or UDP ports and in any arbitrary sequence required by the client device controller 101. The server controller 105 may at its discretion maintain a maximum number of simultaneous open sockets and ports as determined by the practical capabilities of the network I/O subsystem 106. In the event that a previously unopened socket/port combination is required to be open, then an existing open socket/port combination may be closed. The determination of which socket or port to close in this case is determined by a useful algorithm, (e.g. using a least recently used approach).

The client controller 101 is configured to transmit and receive data 110 to and from the server controller 105. The server controller 105 is configured to receive and transmit data 110 from and to the client controller 101. The transmission and reception of data 110 over network 108 occurs over a TCP or UDP port 111 that is specified in the protocol header of the data packet. The client controller 101 is instrumented to instruct the network I/O subsystem 102 to establish TCP or UDP connections 109 to the server network I/O subsystem 106 and perform data transmission and reception on any valid TCP or UDP port (e.g. port numbers 1 through 65535).

In one arrangement, the client controller 101 stores a client side port verification application that, when executed by the controller 101, causes the controller 101 to perform the operations of transmitting and receiving communication, such as echo request messages, echo response messages, and skip instruction messages, relative to the server device 104 in the network 108. The client side port verification application installs on the client controller 101 from a computer program product 118. In certain arrangements, the computer program product 118 is available in a standard off-the-shelf form such as a shrink wrap package (e.g., CD-ROMs, diskettes, tapes, or flash drives). In other arrangements, the computer program product 118 is available in a different form (e.g., propagated signals, a network installation, or downloadable online media). In still other arrangements, the computer program product 118 is part of a storage medium contained within the client controller 101 as part of a memory from which such software may be loaded.

In one arrangement, the server controller 105 stores a server side port verification application that, when executed by the controller 105, causes the controller 105 to perform the operations of opening and closing ports listed as part of a port list received from the client device 100. The server side port verification application installs on the server controller 105 from a computer program product 128. In certain arrangements, the computer program product 128 is available in a standard off-the-shelf form such as a shrink wrap package (e.g., CD-ROMs, diskettes, tapes, or flash drives). In other arrangements, the computer program product 128 is available in a different form (e.g., propagated signals, a network installation, or downloadable online media). In still other arrangements, the computer program product 128 is part of a storage medium contained within the server controller 105 as part of a memory from which such software may be loaded.

Data 110 is transmitted in both directions between client network I/O subsystem 102 and server network I/O subsystem 106. This data 110 is structured to form one of several message blocks integral to the operation of the validation system 114.

The network I/O subsystem 102 on behalf of the client controller 101 is operable to create TCP connections or UDP sessions with the network I/O subsystem 106 to initiate communication with the server controller 105 over any port available in the TCP or UDP protocol (e.g. a port numbering 1 through 65535).

FIGS. 2A through 2G illustrate several message blocks passed over network 108 between the client device 100 and server device 104. Each message is a uniquely arranged data pattern electrically coupled to the network 108 by a network I/O subsystem (FIG. 1 references 102 or 106). These data patterns identify the message as either a start instruction 201 (FIG. 2A), start acknowledgement 203 (FIG. 2B), echo request 204 (FIG. 2C), echo response 206 (FIG. 2D), skip instruction 226 (FIG. 2E), skip acknowledgement 228 (FIG. 2F), or client device result 229 (FIG. 2G).

A start instruction 201, as shown in FIG. 2A is a message containing a port list 217 that includes a list of one or more TCP or UDP ports, indicated as starting with port N and ending in port M (i.e. a range of TCP or UDP ports numbering N through M). The client device 100 is configured to transmit the start instruction 201 to the server device 104 via the network 108.

A start acknowledgement 203, as shown in FIG. 2B, is a message indicating the successful receipt of a start instruction 201. The server device 104 is configured to transmit the start acknowledgement 203 to the client device 100 via the network 108.

An echo request 204, as shown in FIG. 2C, is a message indicative of a solicitation for an echo response. The client device 100 is configured to transmit an echo request 204 to the server device 104 via network 108 over a specified TCP or UDP port number (e.g. 1-65535). The echo request 204 contains an arrangement of bytes that is configured by the client device 100 controller 101 to represent a specific data pattern or payload 219. This data pattern payload corresponds either to a byte arrangement unique to the port the echo request is transmitted over or alternatively, to a byte arrangement unique to the port list 217 as specified in start instruction 201.

When the data pattern payload 219 is arranged uniquely to the port number, the structure of the payload 219 corresponds to a specific network protocol associated with the port number. This network protocol and port number binding is specified according to, but not limited by, the Internet Assigned Numbers Authority (IANA). For example when dealing with an echo request 204 over TCP port 5060, the associated data pattern payload 219 is structured to represent Session Initiation Protocol (SIP) data. When sent over TCP port 25 the data pattern payload 219 is structured to represent Simple Mail Transfer Protocol (SMTP) data. When sent over UDP port 123 the data pattern payload 219 is structured to represent Network Time Protocol (NTP) data.

When structured as a byte arrangement unique to the port list 217 the data pattern payload 219 is represented by a derivative value of the port list 217. For example it could be represented by the arithmetic sum of the port numbers in port list 217 or as a globally unique resource identifier (GUID) as determined by the server device 104 controller 105.

An echo response 206, as shown in FIG. 2D, is a message indicative of a reply to a previously transmitted echo request 204. The server device 104 is configured to transmit an echo response 206 to the client device 100 via network 108 over a specified TCP or UDP port number (e.g. 1-65535). The echo response 206 contains an arrangement of bytes structured as data pattern payload 220 that is configured by the server device 104 controller 105 to represent either a derivation or transformation of the original data pattern payload 219 contained within the corresponding echo request 204 or exactly the same data pattern as transmitted in echo request 204 (i.e. an echo of the data pattern).

In one arrangement, when the echo request 204 data pattern payload 219 is structured to represent a port unique data pattern (such as a port-specific network protocol format) the corresponding echo response 206 data pattern payload 220 is also structured to represent the same port unique network protocol.

As mentioned, the echo response 206 data pattern payload 220 can also be structured to represent the same value as transmitted in the data pattern payload 219 of the associated echo request 204.

Also, as illustrated in FIG. 2E, a skip instruction 226 is a message indicative of a request to skip the validation processing operations associated with a specific single port number 227. For example, the client device 100 is configured to transmit a skip instruction 226 to the server device 104 via network 108. The skip instruction 226 contains a data pattern indicative of the port number 227 to skip during echo processing operation.

As shown in FIG. 2F, a skip acknowledgement 228 is a message indicative of the receipt of a skip instruction 226. The server device 104 is configured to transmit the skip acknowledgement 228 to the client device 100 via network 108.

As indicated in FIG. 2G, the client device result 229 is a message containing the entire results of a completed port list validation operation. The client device 100 is configured to transmit the client device result 229 to the server device 104 over network 108. The client device result 229 contains encoded result data 230 that details information about the validation operation for each and every port in port list 217.

Server device 104 is configured to service multiple concurrent client devices 100. The server device network I/O subsystem 106 is configured to establish a plurality of network connections 109 with a plurality of client devices 100 for purposes of simultaneous communication of path verification operations.

The servicing of a relatively large number of client devices 100 by the server device 104 is possible by the employment of the data packet payload 219 and its subsequent configuration on server device 104 to selectively open and close ports to accommodate practical levels of controller 105 resource utilization.

The data pattern payloads 219, 220 as present in the echo request 204 and echo response 206, respectively, are utilized in the iterative sequencing of network path verification between the client device 100 and server device 104. The reception of such data pattern payload by the respective device 104, 100 is configured as such to cause the next path verification operation to continue in sequence (i.e. reception of a particular payload causes the provisioning and setup of the mechanics of the necessary machinery to receive the next sequenced and expected payload).

The start instruction 201, skip instruction 226, and client device result 229 are configured to be transmitted over a well-established and commonly used TCP or UDP port (e.g. port 80, port 443 or port 8080). These particular ports are open and passable on most modern networks in use. The relay of such instructions is representative of the intention to perform automated network path validation. Any failure in relay of such instructions renders the path validation operation ineffective.

Figure 3:
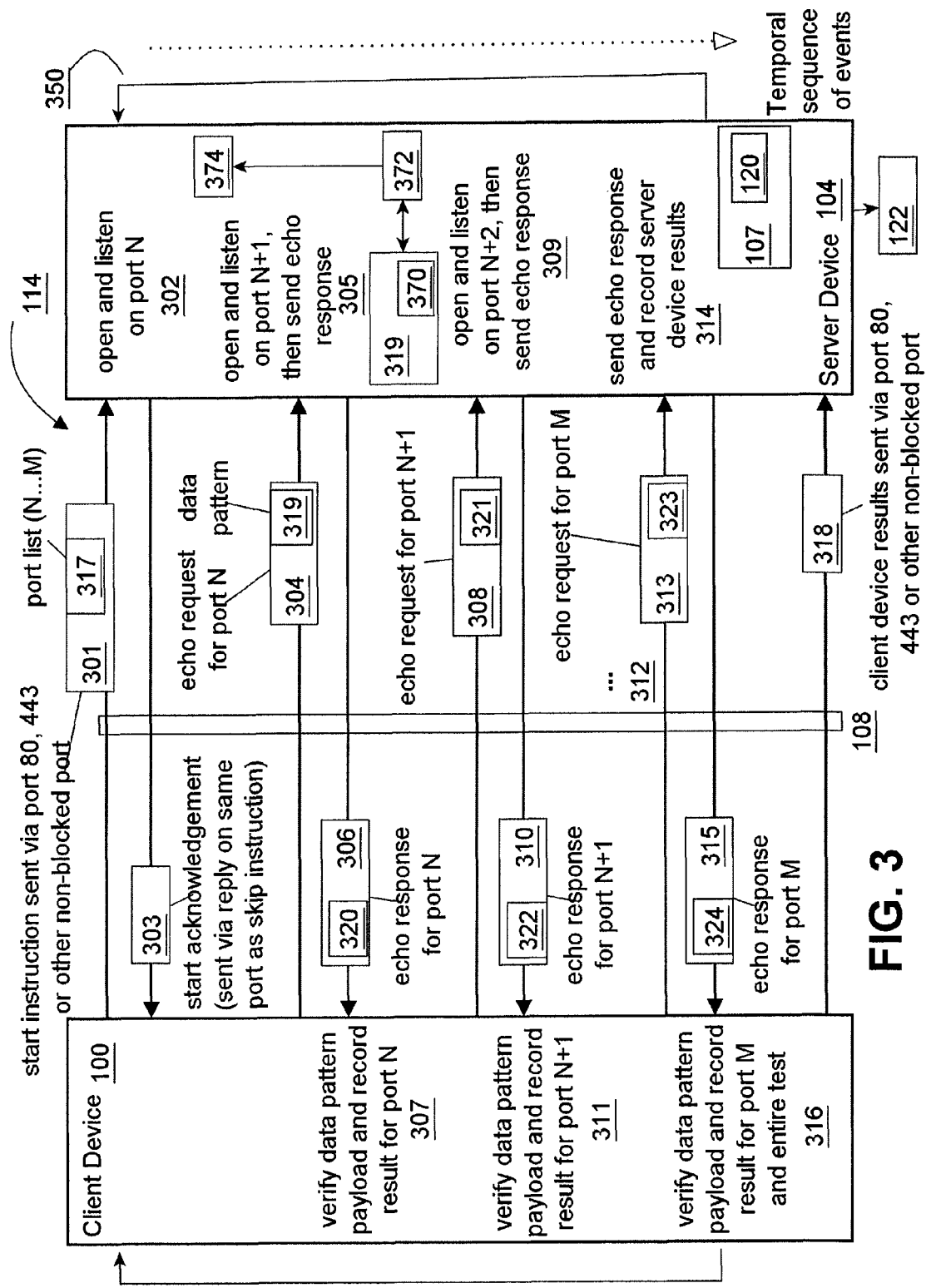
FIG. 3 illustrates a sequence of path verification operations, according to one arrangement.

FIG. 3 illustrates an example arrangement of a temporally ordered sequence of events that the client controller 101 and server controller 105 are configured to execute. These events include the transmission and reception of specific elements of data 110 via network 108 over specific TCP or UDP ports.

Operation begins with the client device 100 sending a start instruction 301 to server device 104. This start instruction 301 is a data transmission containing a port list 317 which is a list of one or more TCP or UDP ports associated with the server device 104, indicated in the figure as starting with port N and ending in port M (i.e. a range of TCP or UDP ports). The server device 104 receives and records in memory the start instruction 301 and port list 317 as part of the current session with the client device 100. The start instruction 301 is sent over a widely utilized TCP or UDP port that is typically open on even the most restrictive networks, i.e. port 80/HTTP or 443/HTTPS.

The server device 104 then proceeds to open and listen on the first identified port in the port list 317 (e.g., opens and listens on port N) as indicated by operation 302 in FIG. 3. After the first port N is open and listening, the server device 104 replies to the start instruction 301 with a start acknowledgement 303. The start acknowledgement 303 is sent from the server device 104 to the client device 100 over the same socket that the start instruction 301 was received. Upon reception of the start acknowledgement 303, the client device 100 executes a sequence of operations to verify connectivity to the server device 104 over the set of ports specified in the port list 317.

The client device 100 sends a request message, such as an echo request message 304, to the server device 104 for the first port in the port list 317 (e.g., as represented by port N in FIG. 3). The echo request 304 is sent over network 108 via port N (either a TCP or UDP port as was represented in port list 317). In one arrangement, the echo request 304 is formatted to contain a data pattern 319 that uniquely identifies either the port being tested N or the entire port list 317 as specified in the start instruction 301.

Upon reception of the request message, such as the echo request 304 for port N, the server device 104 then proceeds to open and listen upon a subsequent identified port (e.g., the next port specified) in the port list 317 (i.e., port N+1) as indicated in operation 305 illustrated in FIG. 3. After opening and listening on port N+1, the server device 104 is configured to transmit a response message 306, such as an echo response 306, over the first identified port in the listing of ports. For example, the server device 104 transmits the response message 306 over same socket or port N over which the echo request 304 was received. Once complete and successfully transmitted, the set of echo request message 304 and response message 306 indicates that communication over network pathway represented by network 108 and port N is verified. Following transmission of the response message 306 to the client device 100, the server device 104 is configured to close the first identified port N in the listing of ports from communication with the client device 100.

With such a configuration, upon reception of a request message 304 from the client device 100, the server device 104 can iteratively open the next-in-line TCP or UDP port identified in the port list 317 for verification by successive echo requests and responses. By opening and listening on only the required ports under verification, the server device 104 can minimize constraining operation of the system 114 as a whole, such as caused by opening and testing multiple sockets or ports simultaneously.

In one arrangement, following testing of a first port on the port list 317, the client device 100 and the server device 104 are configured to verify the remaining ports on the port list 317. It should be noted that while port verification can be performed on sequentially identified ports in the port list 317 (i.e., relative to the first identified port in the listing of ports 317) the port list can sequentially identify the ports in an arbitrary order, (e.g., a listing of port 20, port 405, port 315) but still in sequence.

For example, with continued reference to FIG. 3, the client device 100 can send an echo request message 308 for the subsequent identified port in the port list (e.g., as represented by port N+1). This echo request 308 is sent the over network 108 via port N+1 (e.g., either a TCP or UDP as was represented in port list 317) which was previously opened by the server device 104. Upon reception of the echo request 308 on port N+1, as referenced in operation 309, the server device 104 the proceeds to open and listen upon the next subsequent identified port in the listing of ports 317 (i.e., port N+2) for communication with the client device 100. After opening and listening on port N+2, in response to the echo request 308, the server device 104 transmits a response message or echo response 310 over the same socket or port that the echo request 308 was received. Once complete and successfully transmitted, this set of echo request message 308 and response message 310 indicates that communication over network pathway represented by network 108 and port N+1 is verified. Following transmission of the response message 310 to the client device 100, the server device 104 is configured to close the subsequent identified port N+1 in the listing of ports from communication with the client device 100. This cycle of request/response continues in succession for each subsequent identified TCP and UDP ports represented in port list 317, as indicated by reference 312 in FIG. 3, up to and including the final port M in port list 317.

The server device 104 is configured to iteratively open the ports in response to receiving the request message from the client device 100. For example, reception of an echo request message with corresponding packet payloads causes the server device 104 to iteratively open (e.g., in an arbitrary order, but still in sequence) the next in line TCP or UDP ports to be further verified by successive echo requests and responses. By opening and listening on only the required ports under verification, the server device 104 can minimize constraining operation of the system 114 as a whole, such as caused by opening and testing multiple sockets or ports simultaneously. For example, by utilizing this iterative approach to opening each subsequent port in sequence before performing its verification operation allows the server controller 105 to close any previously listening socket to avoid approaching such limitation of the system 114.

In one arrangement, the server device 104 and the client device 100 are configured to generate reports that indicate a status associated with the transfer of the request message and the response message between the devices 104, 100. For example, upon reception of the echo request message 313 the server device 104 is configured to identify the message 313 as being associated with the final port as specified in port list 317 and record a server validation result 120 of each port request/response cycle performed during the session in data storage 107 for later reporting and processing. The server validation result 120 indicates a status associated with the receiving of each request message and the transmitting of each response message during the process.

In another example, following transmission of the echo request 313, the client device 100 transmits a client validation report 318 which represents the echo request/response activity as detected by the client device 100. While the client validation report 318 can be configured in a variety of ways, in one arrangement, the client validation report 318 includes at least one client validation result associated with the success or failure of the transmission of the request messages and the reception of the response messages. The client device 100 can transmit the client validation report 318 to the server device 104 over the network 108 via a commonly open TCP or UDP port, such as port 80 or port 443. In one arrangement, upon receipt the server device 104 can store the client validation report 318 in data storage 107 for later reporting and processing. For example, the server device 104 can generate a master validation report 122, which includes the server validation report 120 and the client validation report 318, to a user such as a system administrator. Based upon the master validation report 122, the system administrator can determine where successful or unsuccessful port validations occurred in the system 114 from both the client and server sides.

During the transfer of request messages and response messages in the system 114, errors can occur. Errors during the transmission of echo request messages by the client device 100 can be represented either by a connection failure or by a lack of reception of the request by server device 104. Connection failures are directly observable by the network I/O subsystem 102 and reported to controller 101 during operation. For example, an intervening device on network 108 such as a firewall may immediately respond with a TCP RST signal during a TCP connection attempt to cause such a failure.

Errors occurring due to a mismatch of the transmitted data pattern payload 319, 321 or 323 as compared to received data pattern payload 320, 322 or 324 are indicative of an intervening content filtering or proxy server type device inside network 108. The client device 100 performs active comparison of the transmitted data pattern to the received data pattern to detect a mismatch condition. This content filter may mutate or otherwise change the contents of a transmitted data packet and hence will be visible by the sending client device 100 as a mismatch of what was originally sent in the echo request message.

To address errors generated during the exchange of messages between the client device 100 and the server device 104, the client device 100 is configured to generate and transmit a skip instruction message to the server device 100. Aspects of the skip instruction message are described in detail with respect to FIGS. 4 and 5 below.

Figure 4:
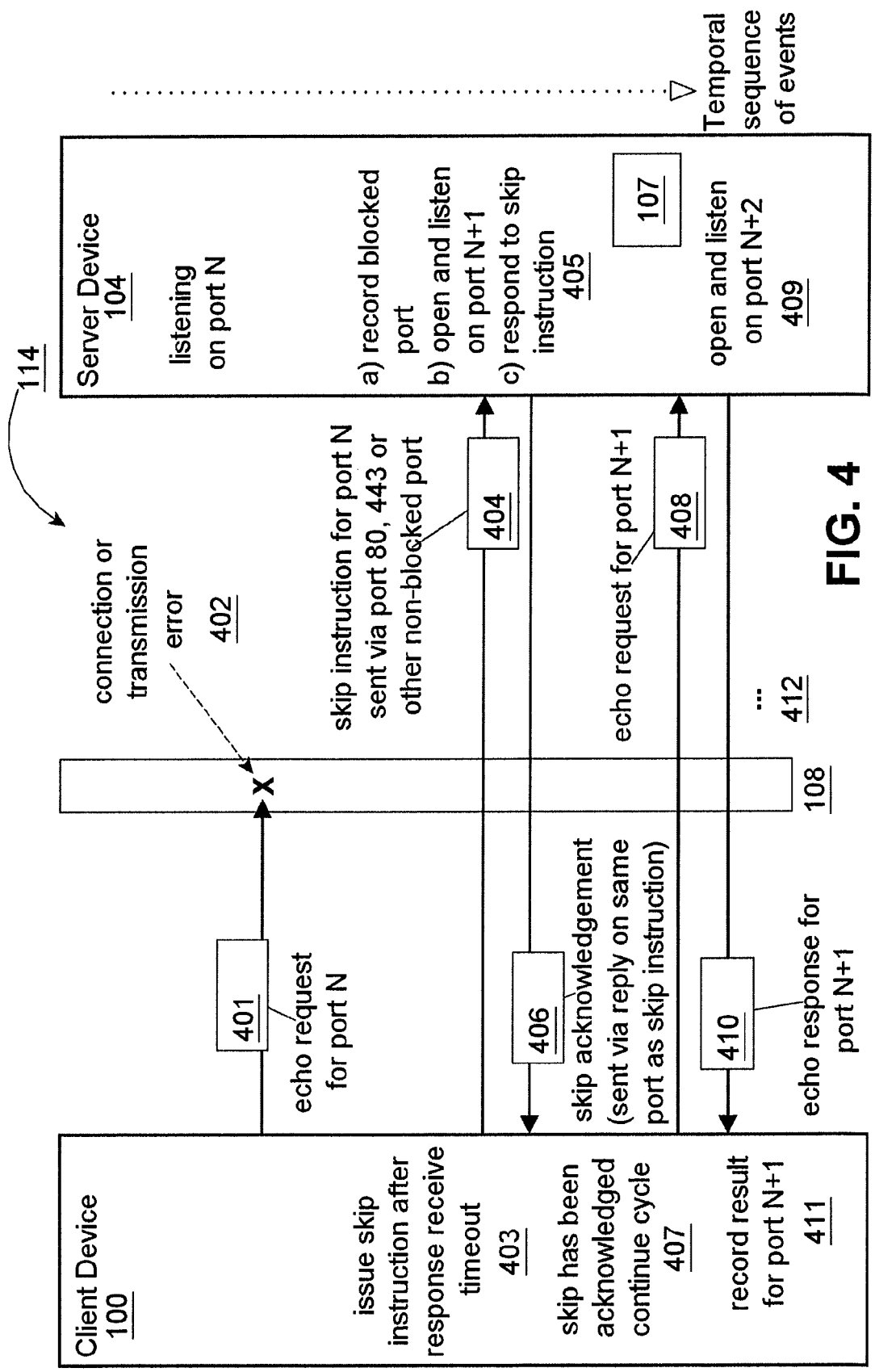
FIG. 4 illustrates a sequence of operations corresponding to the detection and verification of an outbound connection or transmission error condition, according to one arrangement.

FIG. 4 illustrates an example of connection or transmission error 402 created during an echo request operation. Connection errors can occur for a variety of reasons. In one arrangement, a connection error can occur when the client device 100 is unable to establish a TCP connection or UDP session with the server device 104. For example, the error can be manifested as a TCP RST, unanswered TCP connect handshake, unsendable UDP datagrams, or other local TCP or UDP socket failure. In another arrangement, transmission errors can occur due to intervening network devices contained in network 108 or unreliable network structures contained in network 108. These conditions can introduce partial or total data loss during transmission of the echo request or echo response messages which cause the server device 104 to never receive a sent echo request.

For example, with reference to FIG. 4, the client device 100 transmits an echo request message 401 intended for the server device 104 via port N. However, the message 401 is blocked 402 by network 108 or device contained in network 108 for any arbitrary reason (e.g., firewall, content filter, network discontinuity). In such a case, the client device 100 will not receive an expected response message from the server device 104 via the port N.

Accordingly, in response to the client device 100 failing to receive a response message from the server device 104 via the port N, the client device 100 is configured to wait a predetermined amount of time (e.g., controller 101 is configured to self interrupt upon an expiration of a timeout) and send a skip instruction message 404 to server device 104 on a non-blocked port associated with the server device 104. For example, the client device 100 transmits the skip instruction message 404 to the server device 104 via port 80 or port 443. Upon reception of the skip instruction message 404, the server device 104 is configured to perform operations 405. First, the server device 104 records the blocked port N as part of the server validation report 120 in memory 107. The server device 104 then opens and listens on the subsequent identified port N+1 in the listing of ports 117 and sends a skip acknowledgement message 406 back to client device 100 on the non-blocked port. Upon reception of the skip acknowledgement 406, the client device 100 resumes normal echo request processing starting at newly adjusted port N+1 (reference FIGS. 4-407, 408, 409, 410, 411 and 412).

Because of the skip instruction message 404 and the associated skip acknowledgement message 406 the client device 100 receives notification regarding the transmission error during the outbound path operation. Accordingly, the system 114 provides details at the network subsystem 102 level that can indicate failures during connection or transmission. For example, a TCP RST may be received during a connection attempt, or alternatively a UDP datagram could be transmitted in apparent success only to be unanswered by the server device 104 after a preset timeout period.

In one arrangement, a system operator can receive notification from the client device 100 about the presence of a failure condition in the system 114. Appropriate remediation or resolution action can then be taken to address such failure conditions due to the level of detail provided by the failure condition witnessed by client device 100.

For example, several failures conditions can arise and can be categorized as either connection failure or transmission failure. A connection failure can occur due to an immediate error condition on the socket itself or due to a timeout. An immediate error is evident by a detected error during a socket send or open operation, e.g., as caused by the reception of a TCP RST signal or an active denial during sending a UDP datagram via an appropriately configured UDP socket. A timeout is detected by the expiration of a preset time period configured in the client controller 101. When this timeout condition occurs it is indicative of a transmission failure to the recipient server controller 105.

The system operator can receive notification of such verification errors via a user terminal or graphical interface. The notification, such as a master validation report 122 can provide critical insight into the nature of the network obstruction, if present. Upon automated analysis the operator can perform any number of reconciliatory measures to address obstruction. For example the operator can contact the administrator of the network in use, provision a different port or protocol to achieve intentions, or seek out an alternative network connection.

Figure 5:
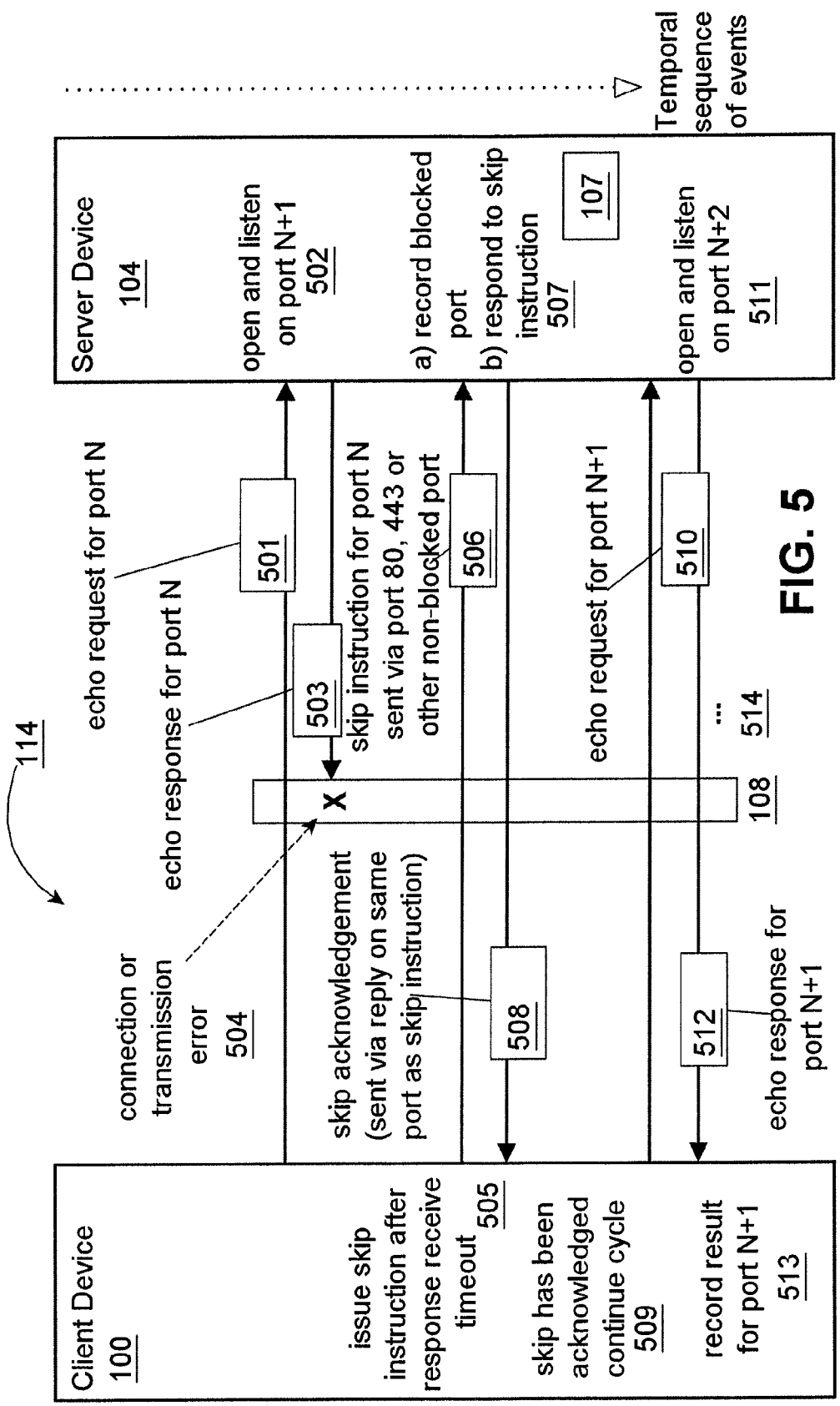
FIG. 5 illustrates a sequence of operations corresponding to the detection and verification of an inbound connection or transmission error condition, according to one arrangement

FIG. 5 illustrates an example of connection or transmission error 504 created during an echo response operation. During operation, the client device 100 performs an echo request 501 on port N which is answered by the server device 104 with an echo response 503. In this example, the network 108 is configured to block the echo response message 503 from the server device 104 along its path back to client device 100. In such a case, the client device 100 will not receive an expected response message from the server device 104 via the port N.

Under these circumstances, in response to the client device 100 failing to receive a response message from the server device 104 via the port N, the client device 100 is configured to wait a predetermined amount of time (e.g., controller 101 is configured to self interrupt upon an expiration of a timeout) and send a skip instruction message 506 to server device 104 on a non-blocked port. Upon reception of the skip instruction message 506, the server device 104 records the blocked port (port N) as part of the server validation report 120 in memory 107 and sends a skip acknowledgement 508 back to client device 100. Upon reception of the skip acknowledgement 508, the client device 100 resumes normal echo request processing starting at newly adjusted port N+1 (reference FIGS. 5. 510, 511, 512, 513 and 514).

Figure 6:
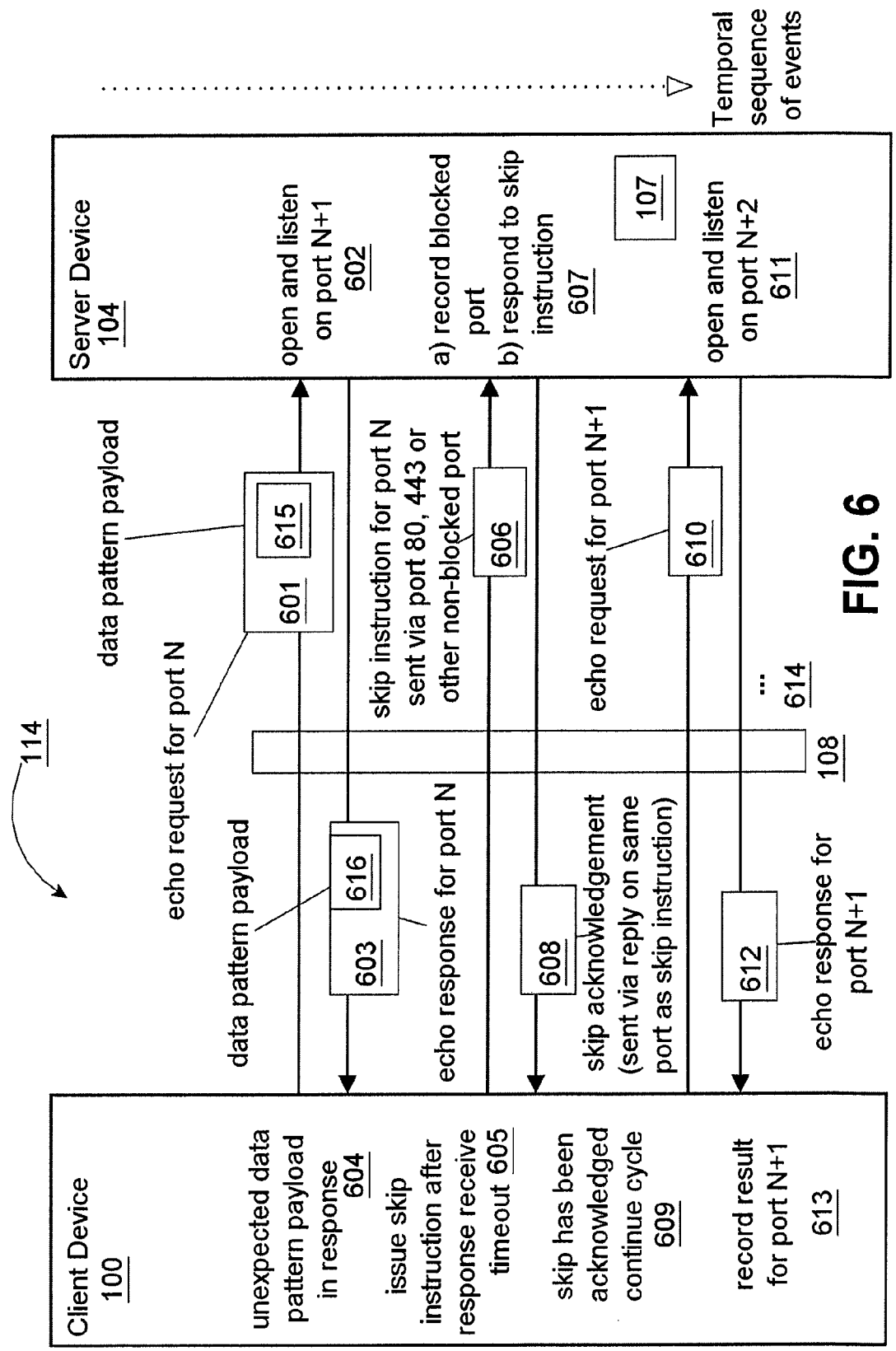
FIG. 6 depicts the operational sequence corresponding to a payload mismatch error condition, according to one arrangement.

FIG. 6 illustrates an example of a data pattern payload mismatch error created during an echo request operation. In one arrangement, during operation, the client device 100 generates an echo request message 601 containing a specific data pattern payload 615 that it expects to receive in a corresponding echo response message. For example, the client device 100 transmits the echo request message 601 having the data pattern payload 615 to the server device 104 over port N using TCP or UDP. In response, the server device 104 receives the echo request message 601 and generates an echo response message 603, in part, by copying the data pattern payload 615 into the data pattern payload 616 of the response message 603. The server device 104 transmits the echo response message 603 to the client device 100 over the same socket connection (TCP or UDP).

Upon reception of the echo response 603, the client device controller 101 compares the contents of the data pattern payload 616 with an expected value. If the data pattern payload does not match the expected value, the verification of port N is deemed a failure and the client device 100 transmits a skip instruction message 606 to the server device 100 to move to the next port in port list 317.

Data pattern payload mismatch, as detected by the client controller 101, can be indicative of an unsolicited mutation of the expected contents of the echo response 616 as sent by the server controller 105. For example, an intervening content filter may not allow returning network traffic of the same type (e.g. protocols such as SMTP or SIP) and may unilaterally inject a textural or HTML-formatted response describing a restriction of such protocol. Detection of such failures indicates the obstruction of transmission and/or reception over that particular TCP or UDP port.

Major operating systems, conventional servers, and network devices provide for a limited number of simultaneous open TCP or UDP socket listeners. Although this number can be configured, employing its maximal value (i.e. 65535 for TCP and UDP) represents an impractical and impossible use of storage and computational resources. This is due to practical limitations in processing or storing state for the large number of data structures required for support of a relatively large numbers of open listeners. Embodiments of the innovation, in one arrangement, provide for an ordered and sequenced of port opening and closing dictated by verification demand, thereby limiting or avoiding the need for a large number of simultaneous open ports. In one arrangement, the server device 104 is configured to open ports upon request and close other open ports on a least recently used (LRU) basis. This configured behavior of the server device provides a relatively large scale of concurrent port verification capability.

For example, ten client devices may issue start instructions to successively test all UDP ports in the range of 1 through 65535. The server device 104 can service all ten client devices at varying levels of progression through the range of 1-65535. Using LRU discretion, the server device 104 can close ports to accommodate the opening of new ports while maintaining a fixed number of maximum simultaneous ports. A typical sustainable maximum number of simultaneous open ports can vary by the capabilities and configuration of the employed network I/O subsystem of the server device 104 (e.g., the register memory capacity or processing level).

As indicated above, the server device 104 is configured to receive a listing of ports 117 from a client device 100 and iteratively open each port on the listing 117 in a sequential manner. Such indication is by way of example only. In one arrangement, the server device 104 is configured to open a plurality of identified ports in the listing of ports 117 for communication with the client device 100.

Figure 7:
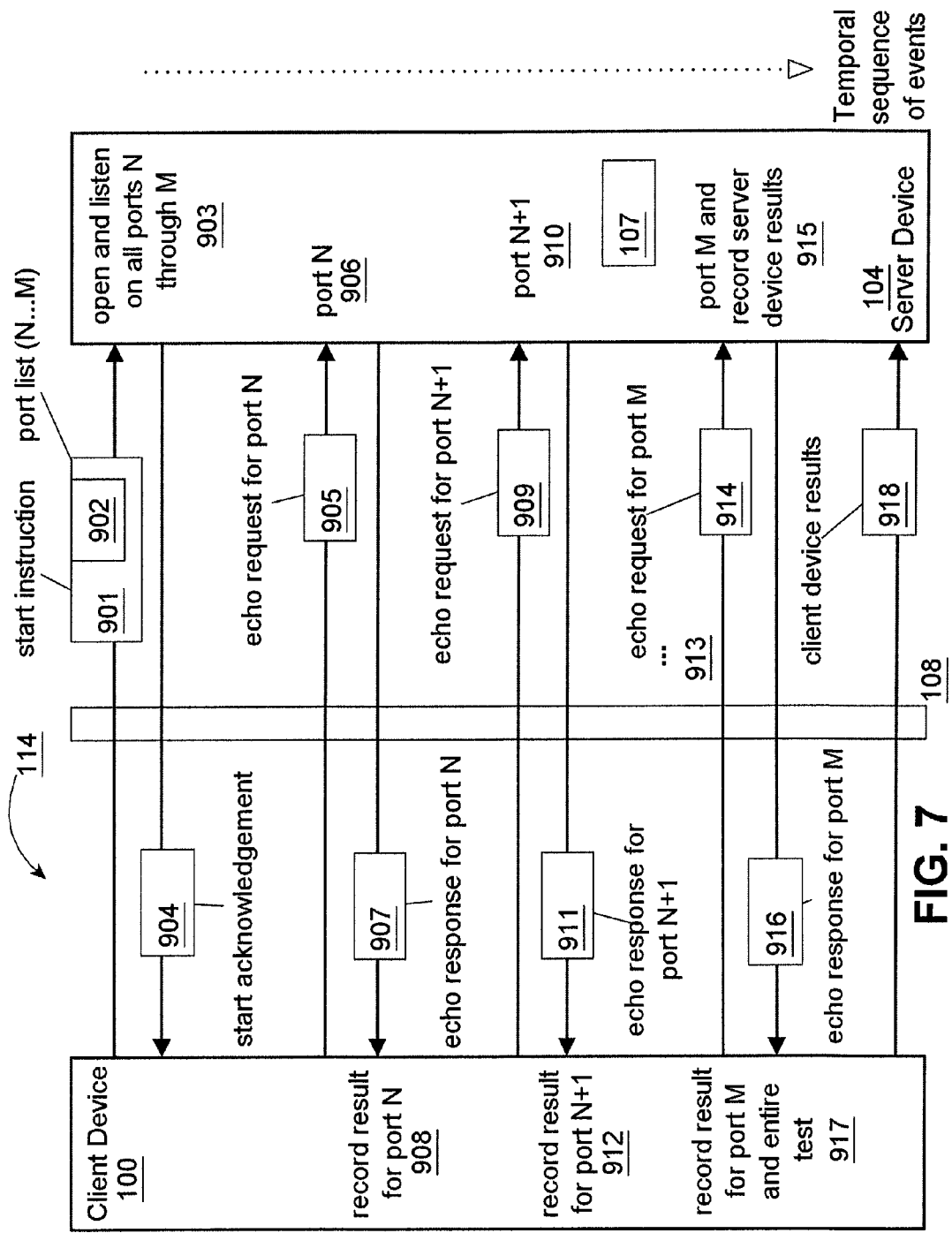
FIG. 7 is an alternative embodiment main sequence of path verification operations, according to one arrangement.

FIG. 7 illustrates an example operation of the server device 104 when opening multiple ports. As illustrated, the client device 100 issues a start instruction 901 with TCP or UDP port list N through M 902. Upon reception of the start instruction 901, the service device 104 configures all ports in the port list 902 (e.g., opening them if necessary) to receive echo requests from the client device 100. The server device 104 answers successive echo requests 905, 909 and 914 with corresponding echo responses 907, 911, and 916. The remaining operation of the server device 104 is as described in the above-referenced arrangement. With such a configuration, the server device 104 opens all ports in the port list 902 at once, rather than in sequence as described above.

Figure 8:
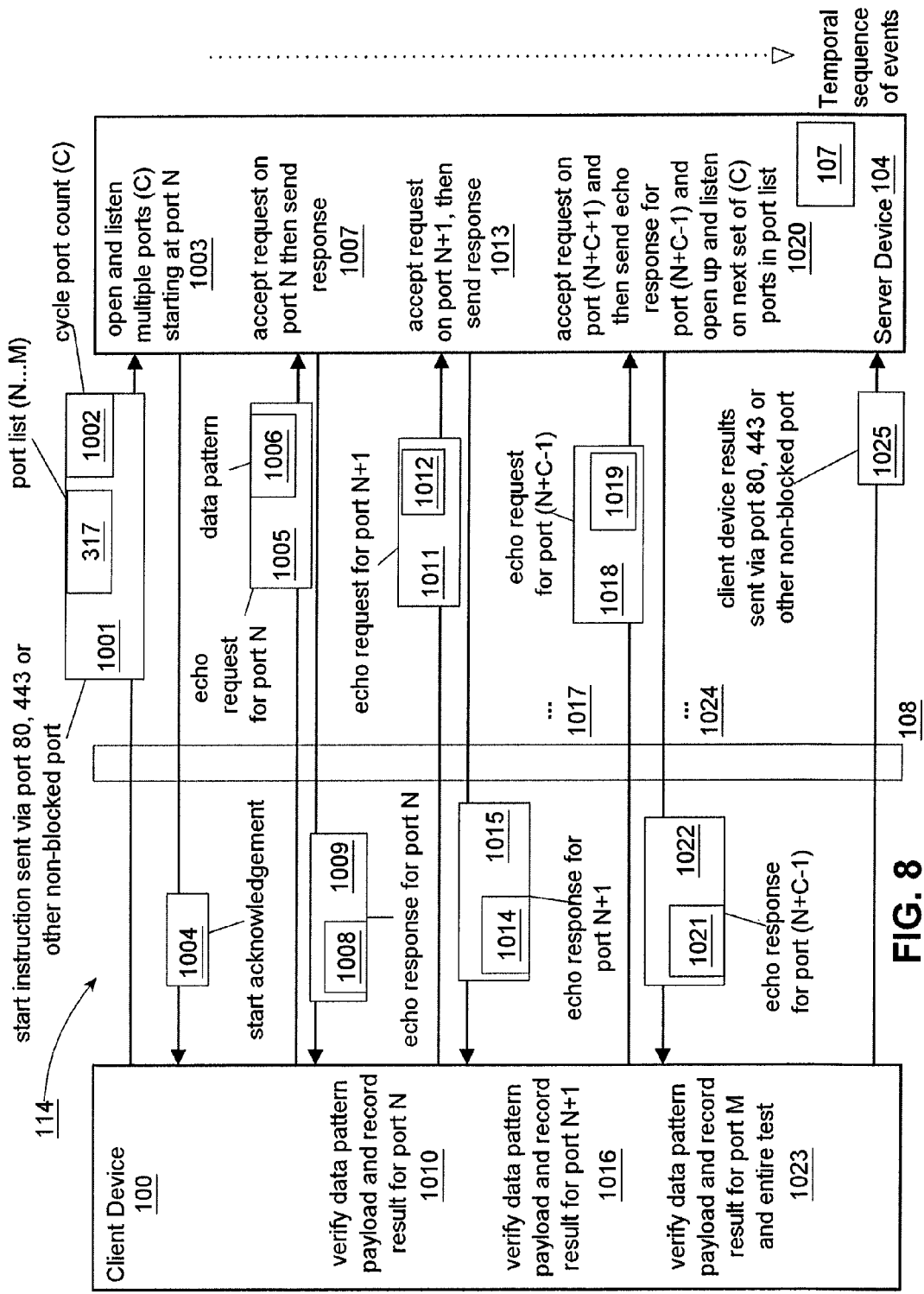
FIG. 8 illustrates a sequence of operations corresponding to performance of a specified number of port echoes before advancing in port list, according to one arrangement.

FIG. 8 illustrates another example of operation of the server device 104 when opening multiple ports. In this example, the server device 104 is configured to perform a batch of echoes for per port and then progress to the next port in the port list.

During operation, the client device 100 forwards a start instruction 1001 to server device 104. The start instruction 1001 includes a port list 317 and a cycle port count 1002. The port list 317 is a list of one or more TCP or UDP ports, indicated in FIG. 8 as starting with port N and ending in port M (e.g., a range of TCP or UDP ports). The cycle port count 1002 is configured as a count representing the number of ports to open at once during advancement through the port list 317, indicated in FIG. 8 as reference C.

The server device 104 then proceeds to open and listen on the number of ports indicated by the cycle port count 1002 from the port list 317 (e.g., the server device 104 open C ports numbering from N . . . C in range N . . . M), as referenced by operation 1003 in FIG. 10. After these ports are open and listening, the server device 104 replies to the start instruction message 1001 with a start acknowledgement message 1004. Upon reception of the start acknowledgement message 1004, the client device 100 begins an orchestrated sequence of operations to classify the communication capabilities to the server device 104 over the set of ports specified in port list 317.

Figure 10:
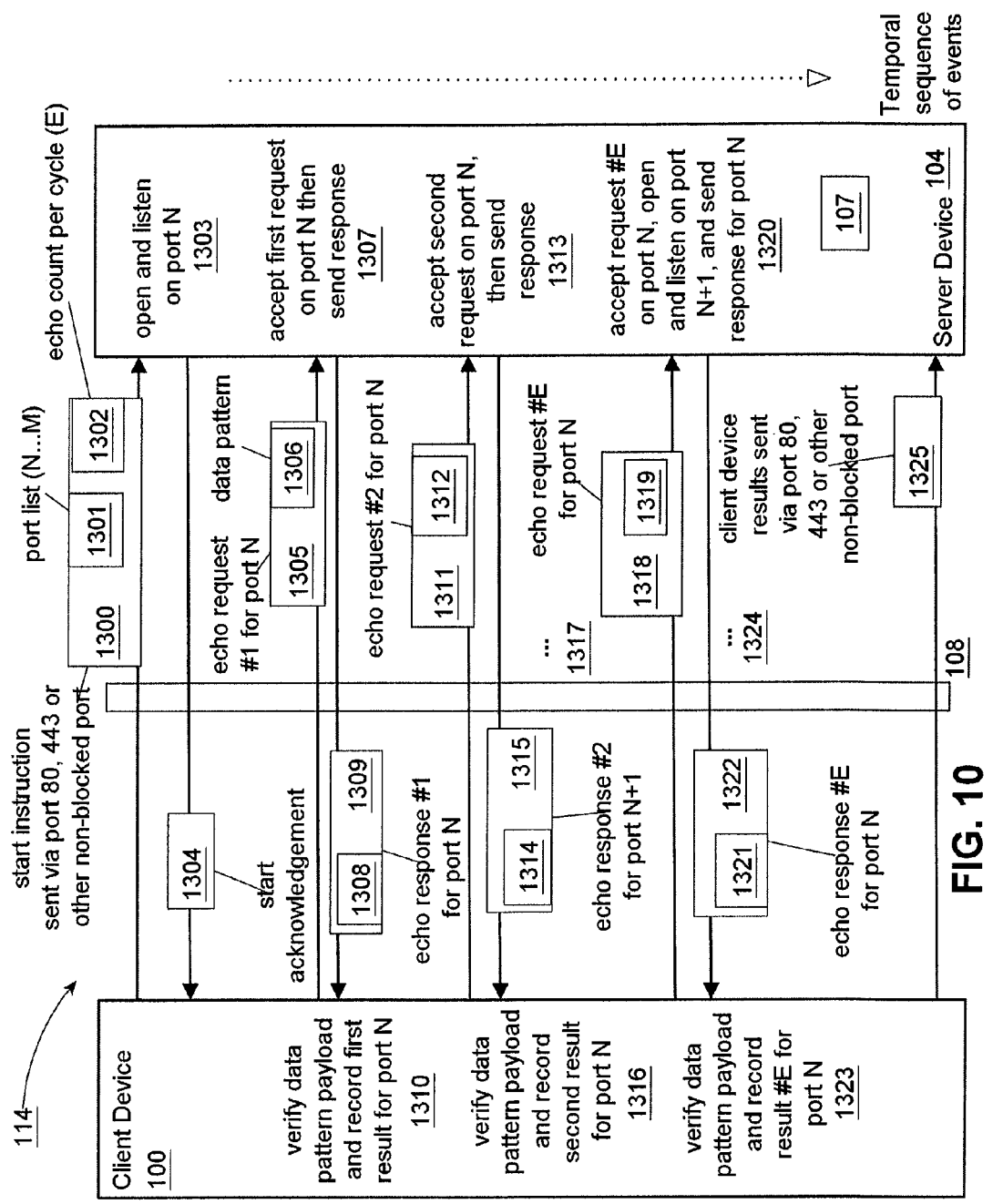
FIG. 10 illustrates a sequence of operations corresponding to performance of repeated echoes on the same port before advancing in port list, according to one arrangement.

For example, the client device 100 sends an echo request message 1005 for the first port in the port list 317 (i.e., as represented by port N in FIG. 10). This echo request message 1005 is sent over network 108 via port N (e.g., either a TCP or UDP port as was represented in port list 317). The client device 100 formats the echo request message 1005 to contain a data pattern 1006 that uniquely identifies either the port being tested or the entire port list 317, as specified in the start instruction message 1001. Upon reception of the echo request 1005 on port N, the server device 104 then proceeds to respond to the echo request message 1005 with an echo response message 1008 over the same socket that echo request message 1005 was received. Once complete and successfully transmitted, this set of echo request and response messages indicate that communication over network pathway represented by network 108 and port N is verified.

This sequence of transmission of echo request and echo response messages continues until the number of ports processed has reached the cycle port count 1002 (i.e., as represented by reference C in FIG. 10). Upon processing this number of echo request and response messages, the server device 104 proceeds to open and listen upon the next port specified in the port list 317 (i.e. port N+1) reference operation 305 in FIG. 3. After opening and listening on port N+1 the server device 104 responds to the echo request 304 with an echo response 306 over the same socket that echo request 304 was received. Once complete and successfully transmitted, this set of echo request and response messages verifies communication over network pathway represented by network 108 and port N.

In one arrangement, the server device 104 is configured to sequence more than one echo request/echo response of an echo cycle at any one time (e.g., over multiple ports concurrently), such as in the case where the server device 104 receives multiple port listings from the client device 100. In such an arrangement, the server device 104 is configured to performing concurrent echoes of several port lists.

Figure 9:
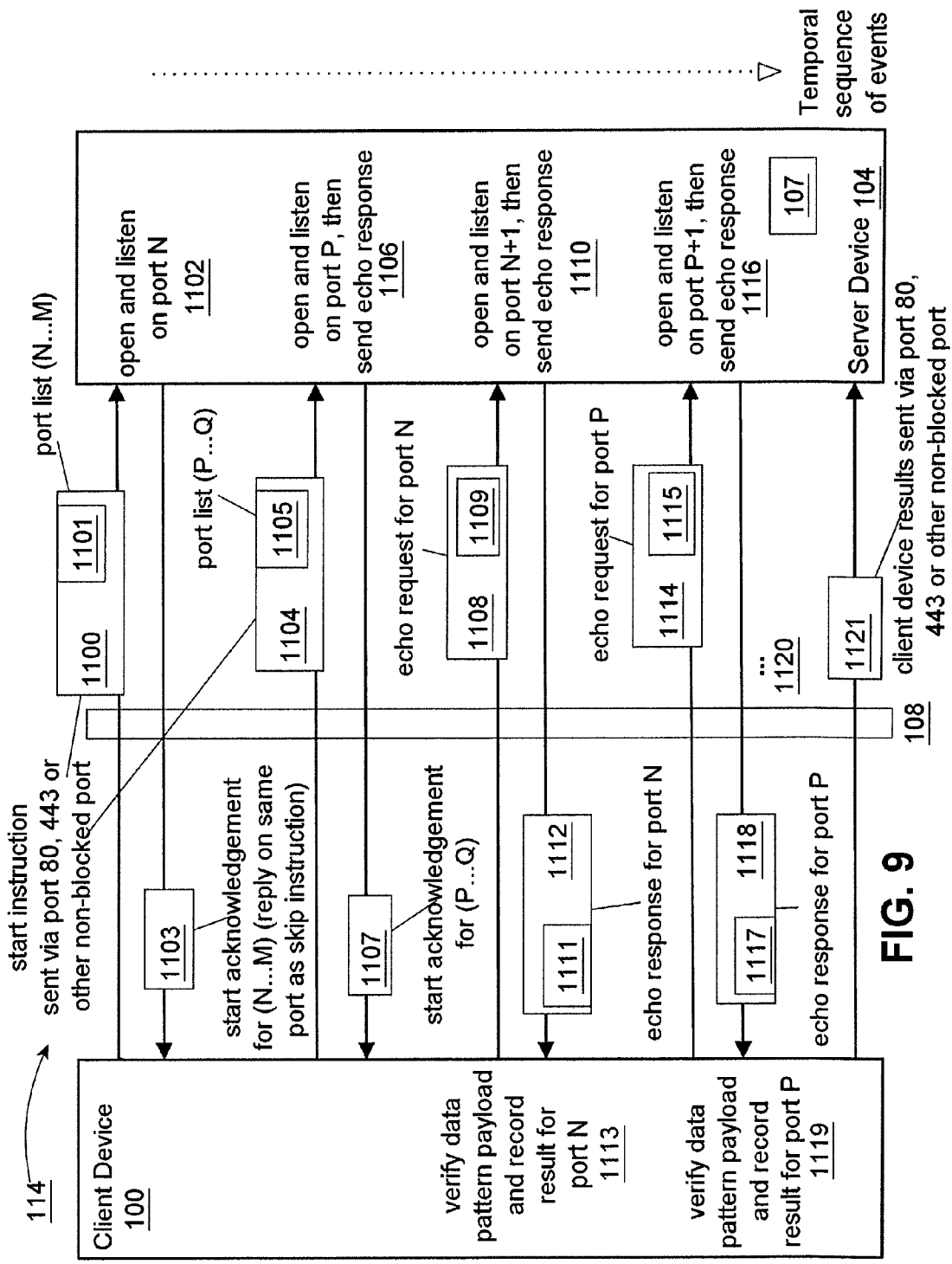
FIG. 9 illustrates a sequence of operations corresponding to the client device performing concurrent port list echo processing, according to one arrangement.

For example, as illustrated in FIG. 9 the client device 100 transmits start instructions 1100 and 1104 to the server device 104 where each of the start instructions specify an independent set of port lists 1101 and 1105, respectively. The echo request and response processing occurs for both, or a multitude of these port lists 1101, 1105 a substantially concurrent manner. In one arrangement, the client device 100 is configured to manage the processing of concurrent start instructions 1100, 1104, echo requests 1108, 1114, echo responses 1112, 1118 as well at the repetition of this sequence as represented by 1120 until all port lists, specified in the diagram as ranges N . . . M and P . . . Q, have been processed.

Upon completion of processing all port lists 1101, 1105, the client device 100 is configured to transmit client device results 1121 to the server device 104. The client device results 1121 specify the result of each echo request and echo response operation performed for all port lists 1101, 1105.

In one arrangement, the client device 100 and server device 104 are configured to perform the network validation process over a given port range, as provided in a port list, multiple times. For example, with reference to FIG. 3, following opening of the last identified port M in the listing of ports 317, the server device 104 is configured to receive a request message 313 from the client device 100 via the port M and transmit the response message 315 to the client device 100 via the port M. The client device 100 and server device 104 then repeat 350 the echo cycle process from the first port N of the listing of ports 317 to the last identified port M in the listing of ports for a preset number of iterations.

Successive iterations through the listing of ports 317 can be configured to extended timeout values for higher resolution path validation (i.e., determining if network 108 is more responsive by waiting longer for connection and transmission operations). Successive iterations of can also provide confirmation by retrying previously failed echo operations between client device 100 and server device 104.

In one arrangement, the client device 100 and server device 104 are configured to perform the network validation process multiple iterations over each particular port, as provided in a port list. Such a sequencing echo processing is configured by either a specified set of parameters an iteration sequence associated directly with the port number itself.

For example, FIG. 10 illustrates the client device 100 and server device 104 exchanging multiple echo request messages and echo response messages on a per port basis over the same port. During operation, the client device 100 transmits a start instruction 1300 to the server device 104 where the start instruction includes a port list 1301 as well as an echo count 1302, referenced in the diagram as value E.

The client device 100 is configured to transmit a number of echo request messages and the server device is configured to provide a number of echo response messages equal to or less than the configured echo count 1302 (value E). For example, the server device 104 is configured to receive the request message 1305 from the client device 100 via the first identified port N in the listing of ports 1301 and transmit the response message 1309 to the client device 100 via the first identified port N for a first iteration of a preset number of iterations. The client device 100 and server device 104 are further configured to further successively process of echo requests 1305, 1311, 1318 and echo responses 1309, 1315, 1322 for the first identified port N. Successive repetitions of echo requests and echo responses are represented by 1324.

Once the echo count 1302 reaches value E, the server device 104 opens the subsequent identified port N+1 in the listing of ports 1301 for communication with the client device 100 and closes the first identified port in the listing of ports 1301 from communication with the client device 100. The client device 100 and server device 104 then restart the process and process multiple echo requests and echo responses for port N+1 and each subsequent port in the listing 1301. Upon completion of processing all port lists, the client device 100 is configured to transmit client device results 1325 to the server device 104. The client device results 1325 specify the result of each echo request and echo response operation performed for all port lists.

While FIG. 10 illustrates a single echo request/response cycle over each port, it should be noted that the system 114 is capable of multiple echo request/response cycles for each port.

As indicated above with reference to FIGS. 2C and 2D, the request message 204 transmitted by the client device 100 and the response message 206 transmitted by the server device 104 can include data pattern payloads 219, 220, respectively. In one arrangement, the data pattern payloads 219, 220 can be defined by either a specified set of parameters (e.g., a property or XML file) or as a pattern associated directly with the port number itself. For example, the data pattern payload 219 of the request message 204 can be composed of any arrangement of bytes that represent a specified set of parameters from client device 100, or an arrangement of bytes associated directly with the port number and protocol (i.e. TCP or UDP) employed for the echo request and echo response. Additionally, the data pattern payloads 220 of the response message 206 can be composed of any arrangement of bytes that represent a specified set of parameters from client device 100 determined by the contents of the corresponding request message 204 or an arrangement of bytes associated directly with the port number and protocol (i.e. TCP or UDP) employed for the echo request and echo response.

In one arrangement, the server device 104 is configured to utilize the data pattern payload 219 of the request message 204 to detect errors in the connection between the client device 100 and the server device 104 for a given port. For example, assume the server device 104 is configured to expect to receive a data pattern 319 representing Simple Mail Transfer Protocol (SMTP) over TCP port number 25. If the byte arrangement of this data pattern 319 was not valid according the definition of SMTP protocol, then the server device 104, in response, generates a validation error 374, as indicated in FIG. 3. In another example, the server device 104 can be configured to receive a unique identifier (e.g., a checksum, hashcode, etc) over UDP port number 5060. If the byte arrangement of this data pattern 319 did not match an expected value (e.g. checksum, hashcode, etc) then the server device 104, in response, generates a validation error 374.

In one arrangement, the server device 104 is configured to utilize the data pattern payload 219 of the request message 204 to detect errors, such as formatting errors, interference by a firewall, or malicious tampering of data bits, in the connection between the client device 100 and the server device 104 for a given port. For example, with reference to FIG. 3, the server device 104 receives the request message 304 having the data pattern or payload 319 from the client device 100. In response to receiving the request message 304, the server device 104 compares a characteristic 370 of the payload 319 with a preset characteristic 372. For example, the server device 104 compares a binary pattern or value 370 of the payload 319 with a preset binary pattern or value 372 associated with the server device 104. Assume the case where the server device 104 detects a mismatch between the binary pattern or value 370 of the payload 319 and the preset binary pattern or value 372 associated with the server device 104 (e.g., the data pattern payload 319 was not what was expected by the server device 104 due to interference along the network). In such a case, the server device 104 detects a mismatch or verification error in the connection with the client device 100, such as indicative of an intervening content filtering device inside network 108 changing the payload 319 of the transmitted request message 204. The server device 104 then generates an error message 374 associated with the mismatch. In one arrangement, the server device 104 records the error result 374 as part of the server validation result 120.

While various embodiments of the innovation have been particularly shown and described, it will be understood by those skilled in the art that various changes in form and details may be made therein without departing from the spirit and scope of the innovation as defined by the appended claims.

For example, during the operation of network path verification the client device 100 and server device 104 record the results of any and all results in data storage 107 and client device controller 101. These results may be displayed via a user interface to indicate the complete details and results of any particular path verification operation. The operator of such interface is then able to take action to address path failures using the detailed information presented about such failures. The server device 104 is configured to present details of failure and success conditions as conducted by itself and its associated network I/O subsystem 106. The client device 100 is configured to present details of failure and success conditions as conducted by its controller 101 and its network subsystem 102. The sum of the server device results and client device results may also be combined into an aggregated result for viewing on a user interface. Such aggregated results can be of particular benefit to a skilled operator as this level of holistic detail can pinpoint exact locations and methods of failure conditions that exist along the network path under verification.

What is claimed is:

1. In a server device, a method for validating a network path in a network, comprising:
receiving, by the server device, a listing of identified ports from a client device, each identified port in the listing of identified ports corresponding to a port of the server device;
receiving, by the server device, a request message from the client device via using a first port, the first port corresponding to a first identified port in the listing of identified ports;
in response to receiving the request message, opening, by the server device, a subsequent port corresponding to a subsequent identified port in the listing of identified ports for communication with the client device, the subsequent identified port immediately following the first identified port in the listing of identified ports; and
following opening of the subsequent port corresponding to the subsequent identified port in the listing of identified ports, transmitting, by the server device, a response message to the client device using the first port.

2. The method of claim 1, comprising, following transmitting the response message to the client device using the first port, closing, by the server device, the first port from communication with the client device.

3. The method of claim 1, further comprising recording, by the server, a server validation result as part of a server validation report, the server validation result indicating a status associated with the receiving of the request message and the transmitting of the response message.

4. The method of claim 3, further comprising:
receiving, by the server device, a client validation report from the client device, the client validation report including at least one client validation result associated with the transmitting of the request message and the receiving of the response message; and
generating, by the server device, a master validation report including the server validation report and the client validation report.

5. The method of claim 1, further comprising:
receiving, by the server device, a skip instruction message on a non-blocked port associated with the server device, the skip instruction message received in response to a failure of the client device to receive the response message from the server device using the first port corresponding to the first identified port; and
in response to receiving the skip instruction message, opening, by the server device, a subsequent port corresponding to a subsequent identified port in the listing of identified ports for communication with the client device.

6. The method of claim 1, wherein opening the subsequent port corresponding to the subsequent identified port in the listing of identified ports for communication with the client device comprises opening, by the server device, a subsequent port corresponding to a sequentially identified port relative to the first identified port in the listing of identified ports for communication with the client device.

7. The method of claim 1, wherein opening the subsequent port corresponding to the subsequent identified port in the listing of identified ports for communication with the client device comprises opening, by the server device, a plurality of subsequent ports corresponding to a plurality of subsequent identified ports in the listing of identified ports for communication with the client device.

8. The method of claim 1, wherein:
receiving the listing of identified ports from the client device, comprises receiving, by the server device, a plurality of listings of identified ports from the client device, each identified port in each of the listing of identified ports corresponding to a port of the server device; and
performing, by the server device, the receiving, opening, and transmitting for each port of the plurality of listings of identified ports in a substantially concurrent manner.

9. The method of claim 2, comprising repeating, for each of the subsequent port and a subsequent port immediately following the subsequent port as identified in the listing of identified ports, by the server device:

receiving a request message from the client device using the subsequent port corresponding to the subsequent identified port in the listing of identified ports;

in response to receiving the request message, opening the subsequent port immediately following the subsequent port corresponding to the subsequent identified port immediately following the subsequent identified port in the listing of identified ports for communication with the client device;

following opening of the subsequent port immediately following the subsequent port, transmitting the response message to the client device via the subsequent port; and closing the subsequent port corresponding to the subsequent identified port immediately following the subsequent identified port from communication with the client device.

10. The method of claim 9, comprising following opening of a last port corresponding to a last identified port in the listing of identified ports, by the server device:

receiving the request message from the client device using the last port corresponding to the last identified port in the listing of identified ports;

transmitting the response message to the client device using the last port corresponding to the last identified port in the listing of identified ports; and repeating the process from the first port corresponding to the first identified port of the listing of identified ports to the last port corresponding to the last identified port in the listing of identified ports for a preset number of iterations.

11. The method of claim 2, comprising, for each identified port of the listing of identified ports, iteratively repeating:

receiving, by the server device, the request message from the client device using the first port and transmitting the response message to the client device using the first port for a preset number of iterations; and in response to reaching the preset number of iterations:

opening, by the server device, the subsequent port corresponding to a subsequent identified port in the listing of identified ports for communication with the client device; and closing, by the server device, the first port corresponding to the first identified port in the listing of identified ports from communication with the client device.

12. The method of claim 1, comprising:

in response to receiving the request message from the client device using the first port corresponding to the first identified port in the listing of identified ports, comparing, by the server device, a characteristic of a payload associated with the request message with a preset characteristic; and generating, by the server device, an error message in response to detecting a mismatch between the characteristic of the payload associated with the request message and the preset characteristic.

13. A server device, comprising:

a controller having a processor coupled to a memory configured to:

receive a listing of identified ports from a client device, each identified port in the listing of identified ports corresponding to a port of the server device;

receive a request message from the client device using a first port, the first port corresponding to a first identified port in the listing of identified ports;

in response to receiving the request message, open a subsequent port corresponding to a subsequent identified port in the listing of identified ports for communication with the client device, the subsequent identified port immediately following the first identified port in the listing of identified ports; and following opening of the subsequent port corresponding to the subsequent identified port in the listing of identified ports, transmit a response message to the client device using the first port.

14. The server of claim 13, wherein following transmitting the response message to the client device using the first port, the controller is configured to close the first port from communication with the client device.

15. The server of claim 13, wherein the controller is further configured to record a server validation result as part of a server validation report, the server validation result indicating a status associated with the receiving of the request message and the transmitting of the response message.

16. The server of claim 15, wherein the controller is configured to:

receive a client validation report from the client device, the client validation report including at least one client validation result associated with the transmitting of the request message and the receiving of the response message; and generate a master validation report including the server validation report and the client validation report.

17. The server of claim 13, wherein the controller is configured to:

receive a skip instruction message on a non-blocked port associated with the server device, the skip instruction message received in response to a failure of the client device to receive the response message from the server device using the first port corresponding to the first identified port; and in response to receiving the skip instruction message, open a subsequent port corresponding to a subsequent identified port in the listing of identified ports for communication with the client device.

18. The server of claim 13, wherein when opening the subsequent port corresponding to the subsequent identified port in the listing of identified ports for communication with the client device, the controller is configured to open a subsequent port corresponding to a sequentially identified port relative to the first identified port in the listing of identified ports for communication with the client device.

19. The server of claim 13, wherein when opening the subsequent port corresponding to the subsequent identified port in the listing of identified ports for communication with the client device, the controller is configured to open a plurality of subsequent ports corresponding to a plurality of subsequent identified ports in the listing of identified ports for communication with the client device.

20. The server of claim 13, wherein:

when receiving the listing of identified ports from the client device, controller is configured to receive a plurality of listings of identified ports from the client device, each identified port in each of the listing of identified ports corresponding to a port of the server device; and perform the receiving, opening, and transmitting for each port of the plurality of listings of identified ports in a substantially concurrent manner.

21. The server of claim 14, wherein the controller is configured to, for each identified port of the listing of identified ports, iteratively repeat:
  receiving the request message from the client device using the first port and transmitting the response message to the client device using the first port for a preset number of iterations; and
  in response to reaching the preset number of iterations:
    open the subsequent port corresponding to a subsequent identified port in the listing of identified ports for communication with the client device; and
    close the first port corresponding to the first identified port in the listing of identified ports from communication with the client device.

22. The server of claim 13, comprising:
  in response to receiving the request message from the client device using the first port corresponding to the first identified port in the listing of identified ports, the controller is configured to compare a characteristic of a payload associated with the request message with a preset characteristic; and
  generate an error message in response to detecting a mismatch between the characteristic of the payload associated with the request message and the preset characteristic.

23. A computer program product having a non-transitory computer-readable medium including computer program logic encoded thereon that, when performed on a controller of a server device causes the server device to:
  receive a listing of identified ports from a client device, each identified port in the listing of identified ports corresponding to a port of the server device;
  receive a request message from the client device using a first port, the first port corresponding to a first identified port in the listing of identified ports;
  in response to receiving the request message, open a subsequent port corresponding to a subsequent identified port in the listing of identified ports for communication with the client device, the subsequent identified port immediately following the first identified port in the listing of identified ports; and
  following opening of the subsequent port corresponding to the subsequent identified port in the listing of identified ports, transmit a response message to the client device using the first port.

* * * * *